May 26, 1970 — G. R. McGUINNESS — 3,514,053
AIRCRAFT, ESPECIALLY OF THE VTOL TYPE
Filed Dec. 19, 1967 — 4 Sheets-Sheet 1
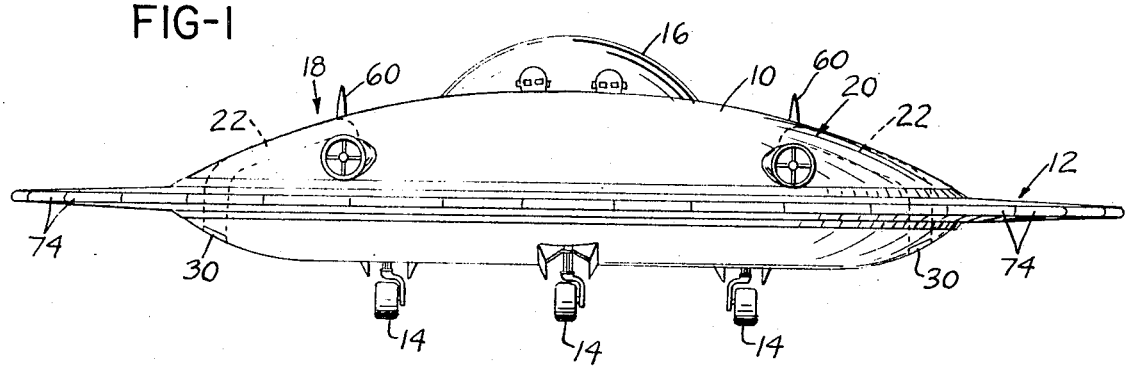
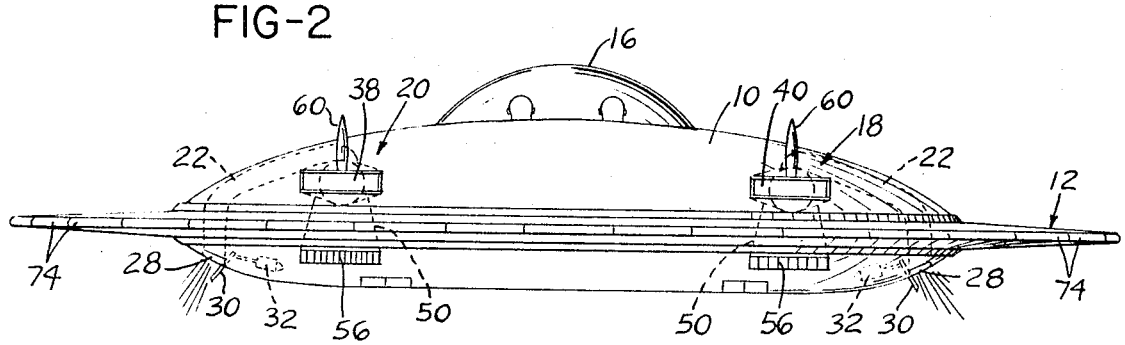
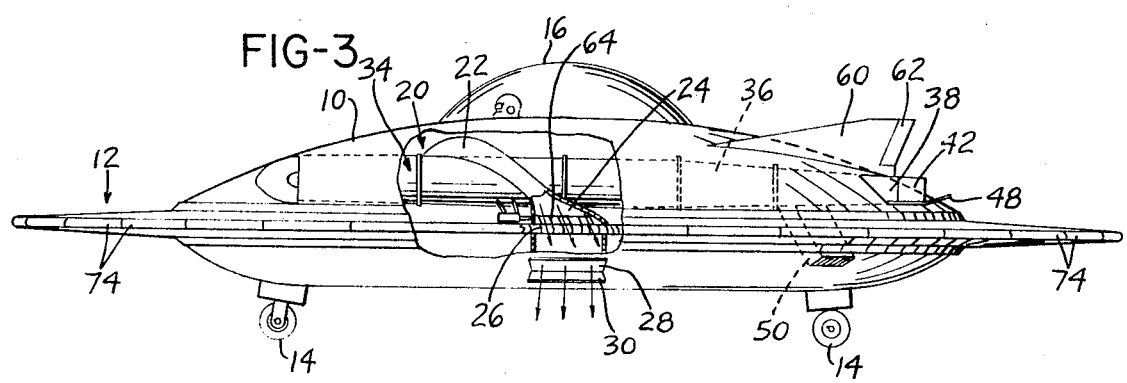
INVENTOR.
Gilbert R. McGuinness

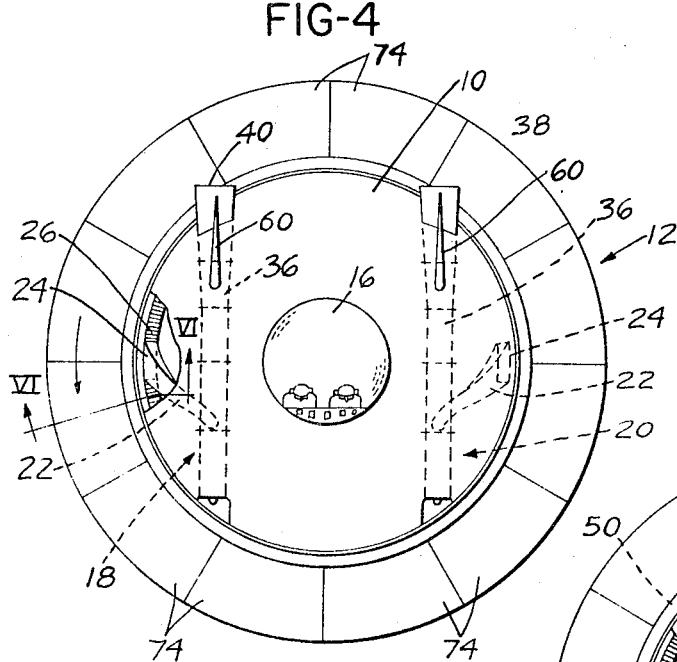
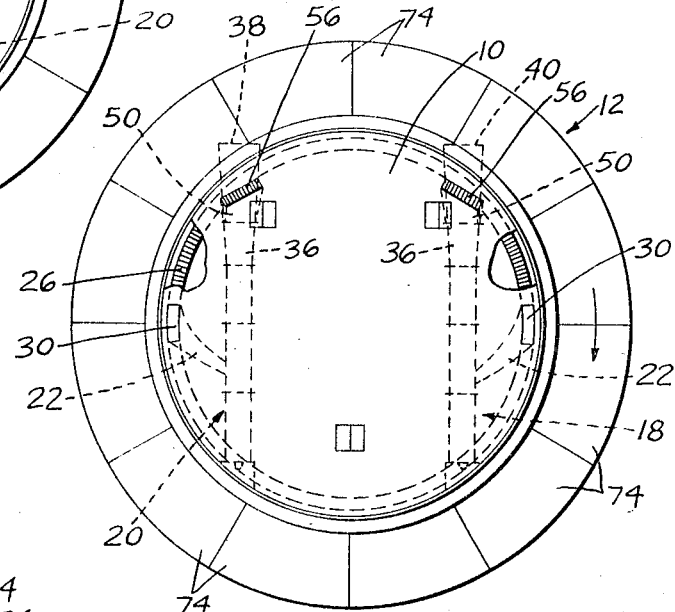
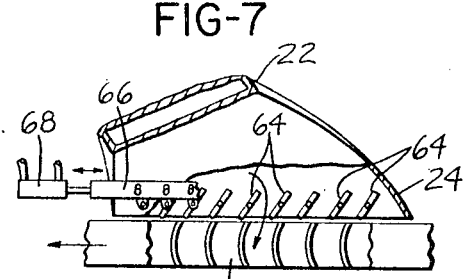
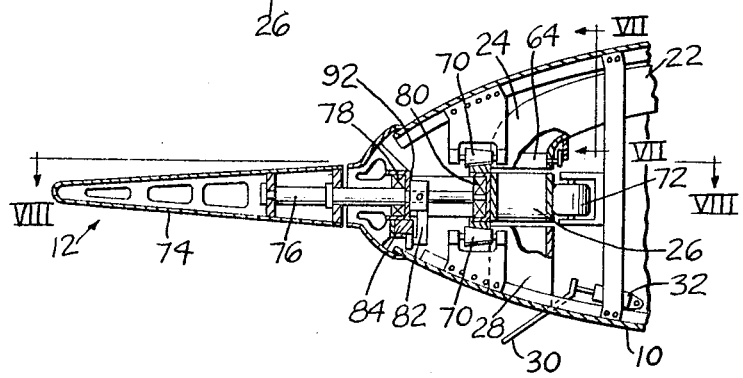

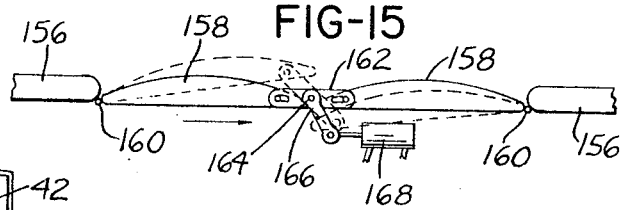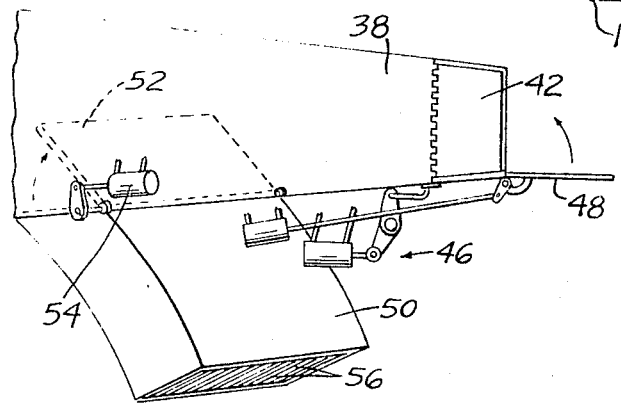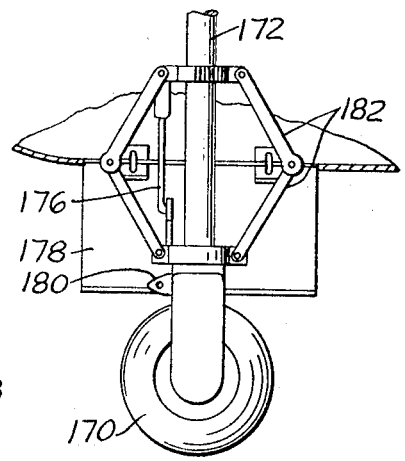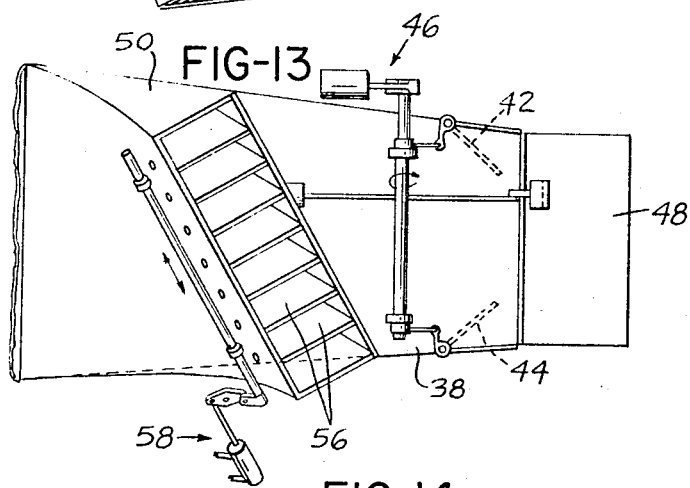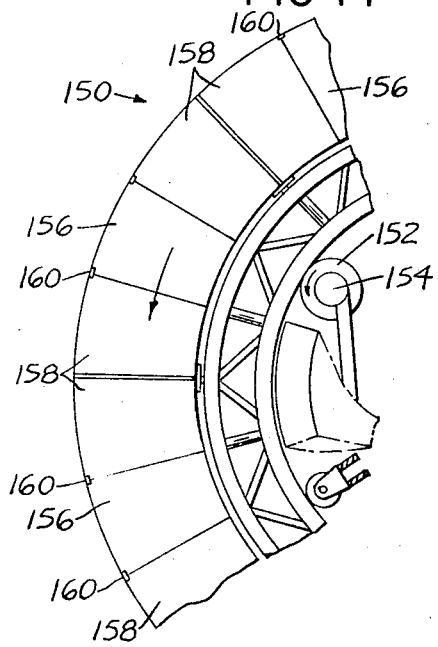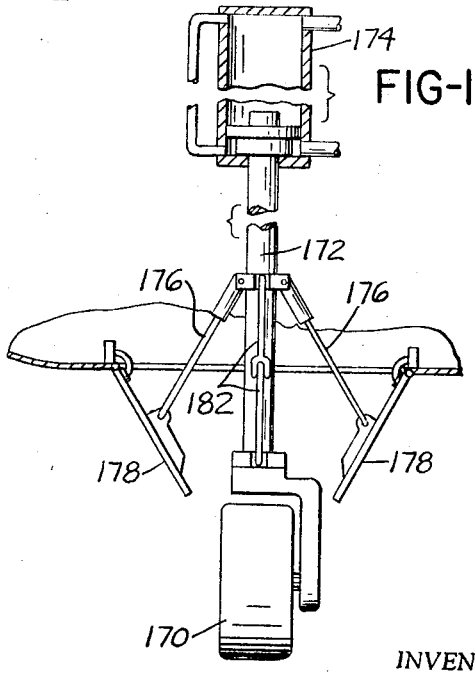

United States Patent Office 3,514,053
Patented May 26, 1970

3,514,053
AIRCRAFT, ESPECIALLY OF THE VTOL TYPE
Gilbert R. McGuinness, 1596 Oakland Ave.,
Dayton, Ohio 45409
Filed Dec. 19, 1967, Ser. No. 691,755
Int. Cl. B64c 15/06
U.S. Cl. 244—12            6 Claims

ABSTRACT OF THE DISCLOSURE

Aircraft, especially of the VTOL type, in which a disc-like fuselage has a bladed rotor concentrically mounted thereon in surrounding relation thereto with engine means in the fuselage for driving said rotor on the fuselage and for developing forward and maneuvering thrusts on said aircraft; the blades of said rotor extending radially and being tiltable on respective axes which extend radially.

---

This invention relates to aircraft, and is particularly concerned with a vertical take-off and landing aircraft, commonly referred to as a VTOL type aircraft.

More particularly still, the present invention relates to an aircraft of the general type referred to which has novel lifting means associated therewith and includes novel means for controlling the aircraft in flight.

The present invention is particularly concerned with an aircraft substantially disc-like in shape when viewed from above and having a bladed ring-like rotor extending about the periphery thereof which is supported on the aircraft fuselage and is driven in rotation thereon to impart vertical lift to the aircraft. The main body portion or fuselage of the aircraft is located inside the rotor and supports the rotor on bearings and comprises passenger and cargo space and also embodies engine means to provide power for rotating the rotor on the fuselage and also for providing power to impart horizontal thrust to the aircraft. Maneuvering of the aircraft in flight is accomplished, at least in part, by motive power derived from the aforementioned engine means in the form of jets or directed discharge of air.

A particular object of the present invention is to provide a novel type aircraft, particularly a VTOL type aircraft having a new type of lift means associated therewith.

Another object of the present invention is to provide an aircraft of the type referred to above which is extremely maneuverable.

Still another object of this invention is the provision of an aircraft of the type above referred to which is relatively compact.

The foregoing objects as well as still other objects and advantages of the present invention will become more apparent upon reference to the following detailed specification, taken in connection with the accompanying drawings, in which:

FIG. 1 is a front elevational view of the aircraft, according to the present invention, resting on the ground;

FIG. 2 is a rear elevational view of the aircraft as it appears in flight;

FIG. 3 is a side elveational view of the aircraft resting on the ground and partially broken away to show a detail thereof;

FIG. 4 is a top plan view of the aircraft partly broken away to show details of construction;

FIG. 5 is a bottom plan view of the aircraft broken away to show details of construction;

FIG. 6 is a sectional view indicated by line VI—VI on FIG. 4 and drawn at somewhat enlarged scale and illustrating the arrangement for tilting the blades of the bladed rotor of the aircraft;

FIG. 7 is a sectional view indicated by line VII—VII on FIG. 6 and showing adjustable inlet blades forming a part of an air turbine for driving the blade rotor.

FIG. 12 is a somewhat diagrammatic view showing the discharge end of one of the jet engines of the aircraft and illustrating control flaps pertaining thereto;

FIG. 13 is a view looking up from the bottom of FIG. 12;

FIG. 14 is a view like FIG. 8 but shows a different drive for the blade rotor;

FIG. 15 is a view similar to FIG. 11 but shows a different arrangement of the blades of the rotor;

FIG. 16 is a view showing a wheel of the landing gear of the aircraft; and

FIG. 17 is a view looking in from the left side of FIG. 16.

Figure 8:
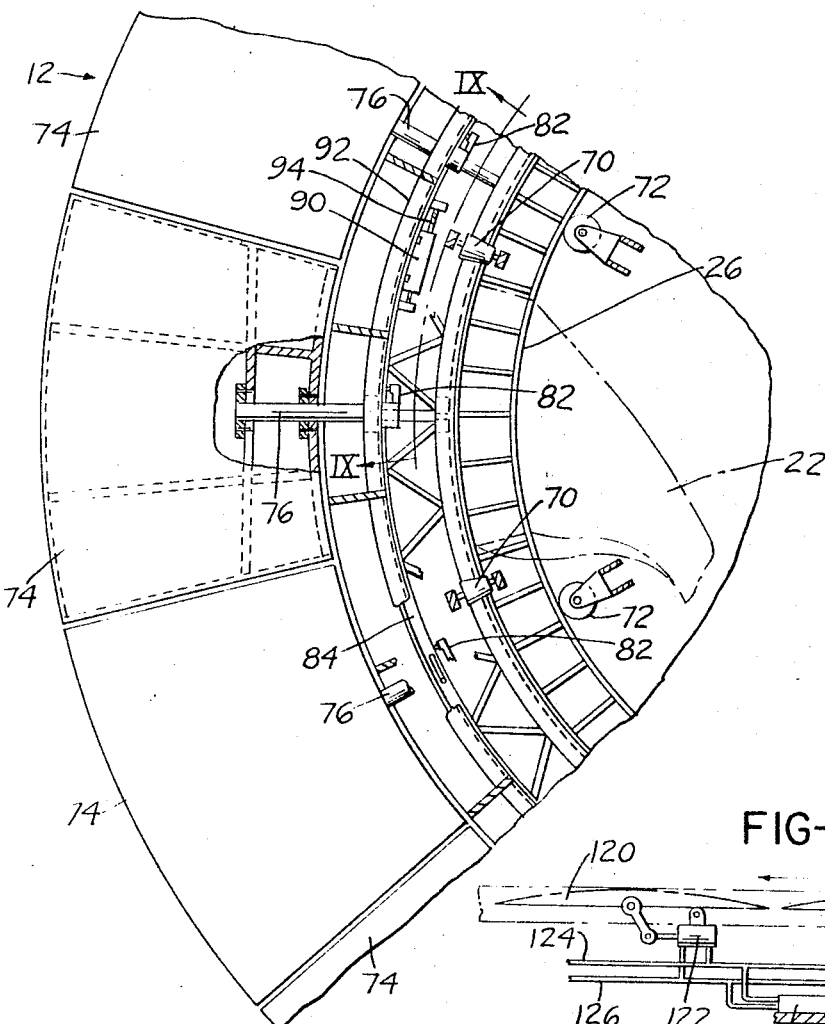
FIG. 8 is a sectional view indicated by line VIII—VIII on FIG. 6 and showing the blade rotor and parts pertaining thereto.

Referring to the drawings somewhat more in detail, and with particular reference to FIGS. 1 through 5, the aircraft comprises a central disc-like fuselage portion 10 and a bladed rotor 12 supported for rotation on the said fuselage. The fuselage may be provided with recesses on the bottom having doors for receiving retractable landing gear wheels 14. The fuselage is preferably substantially flat on the bottom but is arcuate on top and in the center has a passenger compartment which may be covered by the transparent dome member 16. The greater thickness of the fuselage above bladed rotor 12 permits the mounting in the upper portion of the fuselage of a pair of jet engines 18 and 20 each of which engines comprises an engine part proper toward the rear and a compound compressor toward the front.

As will be seen in FIGS. 1 through 5, each compound compressor has a discharge duct 22 leading therefrom to a nozzle 24 which is positioned over an air turbine 26 which is fixed to the blade ring 12. It will be evident that air blown through ducts 22 by the respective compound compressor, will actuate air turbine 26 and thereby cause bladed rotor 12 to rotate on the fuselage.

On the opposite side of the air turbine 26 from nozzle 24 is a discharge nozzle means 28 through which the air exhausted from the turbine passes. The discharge nozzle means 28 advantageously open in a downward direction thereby assisting in imparting lift to the aircraft. Furthermore, a tiltable flap 30 is associated with each discharge nozzle means 28 and has a pertaining actuating motor 32 connected thereto so that the positions of the respective flaps can be adjusted thereby to deflect the discharge from exhaust nozzle means 28 more or less in the lateral direction.

The provision of the control flaps 30 permits the air discharged from the discharge nozzle means 28 to be employed for controlling the aircraft while in flight.

Each of the aforementioned engine means 18 and 20, generally referred to heretofore, will be seen in FIGS. 3, 4 and 5 to comprise a compound compressor portion 34 toward the front and which compressor supplies duct 22 and a more or less conventional jet engine portion 36 toward the rear. Each jet engine portion discharges toward the rear of the aircraft through a respective discharge opening 38, 40 as will be seen in FIGS. 2, 4 and 5. The discharge from the engine discharge jets provides the aircraft with forward thrust.

Turning for the moment to FIGS. 12 and 13 it will be seen that each of the openings 38 and 40, opening 38 being illustrated in FIGS. 12 and 13, has vertical flaps 42 and 44 pertaining thereto which can be tilted inwardly and outwardly by an actuator mechanism generally indicated at 46 thus to vary the area of the discharge opening of the jet engine. Furthermore, pivoted to the discharge member for the respective jet engine and rearwardly of flaps 44 is another flap 48 which can be tilted upwardly in the blast from the jet engine so as to deflect the said jet in the upward direction, thereby developing a downward force on the rear of the aircraft. By the manipulation of the flaps 42, 44 and 48 pertaining to the two jet engines substantially full maneuverability of the craft can be had particularly when employed in connection with the aforementioned flaps 30 pertaining to the discharge nozzle means associated with the rotor drive turbine.

For still further control of the aircraft, each of the jet engines near its discharge end has a generally downwardly directed discharge member 50. Discharge from either jet engine can be variably diverted into the respective discharge member 50 by manipulation of a flap 52 which is under the control of an actuator 54. When flap 52 is raised upwardly from the position wherein it closes the inlet end of member 50, some of the discharge from the pertaining jet engine will be diverted downwardly through the respective discharge opening 50 and develop a generally downwardly directed blast which will exert an upward force on the aircraft in the region of the respective discharge member. Direction can be imparted to the blast from the respective discharge members 50 by the tiltable blades 56 arranged in each discharge member 50 and under the control of actuating means generally indicated at 58. This last mentioned control of the blast from the respective discharge members 50 is more or less laterally of the aircraft so as to impart turning forces thereon.

Suitable controls not illustrated in the application can be provided for causing the flaps or vanes 56 in the two discharge members 50 to operate in unison or individually and cause them to move either in the same direction or opposite directions depending on what particular motion of the aircraft is desired at the moment.

The fuselage preferably has stabilizer means 60 of which there may be one on top of the fuselage in the region of the discharge end of each of the turbines. These stabilizers may be substantially conventional in construction and may include tiltable flap means as at 62 to permit control of the flight of the aircraft in a conventional manner.

Turning now to FIG. 6, which is a section indicated by line VI—VI on FIG. 4, the end of air supply duct 22 will be seen where it supplies air to the air turbine 26. FIG. 6 will also show the discharge nozzle means 28 for the air turbine, the flap 30 pertaining to the discharge means, and the actuator 32 for the flap. FIG. 6 will also show that the extreme discharge end of duct 22 embodies tiltable vanes 64 for imparting direction to the air discharged from duct 22 to the blades of air turbine 26. Vanes 64, as will be seen in FIG. 7, are angularly adjustable in the end of duct 22 by means of an actuating mechanism comprising a bar 66 and an actuating motor 68.

FIG. 6 will also show that the rotor 12 is mounted on fuselage 10 by means of at least one set of guide rollers or bearing means 70 and a second set of guide rollers or bearing means 72. Many bearing arrangements are possible for rotatably supporting the rotor on the fuselage and the particular ones illustrated in FIG. 6 are merely exemplary of many different arrangements that could be used for this purpose.

FIGS. 4 and 5 will show that the rotor comprises a plurality of blades 74 each of which is in the form of a sector and with the sectors arranged in end to end relation to make up the annular angular configuration illustrated.

According to the present invention, each of the blades 74 is tiltable on a respective support shaft, extending radially of the rotor, to vary the angle of attack of the respective blade and thereby to vary the lift imparted to the aircraft by the rotor as it is driven in rotation.

FIG. 6 will show a respective blade 74 mounted on a respective shaft 76 extending radially of the rotor and fuselage and rotatably supported in bearings 78 and 80. Each shaft 76 preferably has an arm 82 attached thereto so that the angularity of the blade mounted on the respective shaft can be adjusted by actuation of the arm.

The construction above described in detail is illustrated in FIGS. 6, 7 and 8.

FIGS. 6 and 8 will also show that the structure includes an annular adjusting ring 84 which pivotally engages all of the arms 82 so that adjustment of ring 84 will simultaneously adjust all of the blades 74 and in the same direction and by equal amounts.

Figure 9:
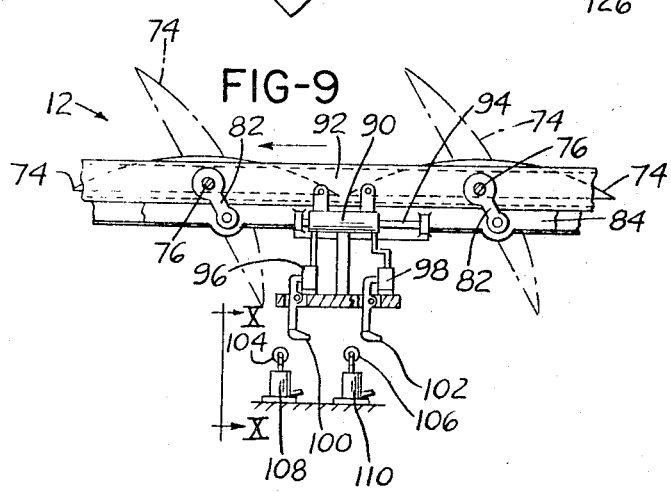
FIG. 9 is a somewhat schematic view showing actuating means for tilting the blades of the blade rotor.
Figure 10:
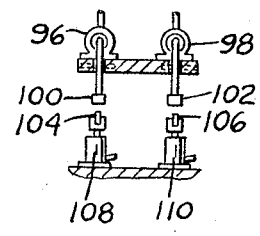
FIG. 10 is a view looking in on line X—X on FIG. 9 showing the arrangement of the actuating means of FIG. 9.

Adjustment of ring 84 may be effected by the arrangement shown in FIGS. 9 and 10 wherein a double acting hydraulic motor 90 is provided having a cylinder attached to member 92 forming a part of the rotor frame and having a piston portion connected by rod means 94 with adjusting ring 84. Connected to the opposite ends of the cylinder of the hydraulic motor are the pumps 96 and 98 which may be of any desired type but which, advantageously, are small simple pumps capable of delivering in one direction only and each having a reciprocating element therein which causes discharge of fluid from the respective pump when actuated. Pumps 96 and 98 are mounted on the frame of the rotor so as to move therewith and there is likewise pivotally mounted in the frame of the rotor a respective pivoted actuating lever 100, 102 for each of the pumps 96, 98.

The actuating levers are adapted for actuation by respective actuating elements 104, 106 which are stationary in the fuselage of the aircraft and each of which has associated therewith a respective cylinder 108, 110. The respective actuating elements are moveable from retracted position outwardly into the paths of the respective actuating levers by a supply of pressure fluid to the respective cylinders 108, 110.

As will be seen in FIG. 10, which is a view taken looking parallel to the direction of movement of the pumps 96, 98 and their respective actuating levers 100, 102, it will be seen that each moves in its own individual path and that the actuating elements 104, 106 and their respective cylinders 108, 110 are located in alignment with the paths of the actuating levers. The actuating levers can thus be selectively actuated thereby to move adjusting ring 84 in one direction or the other as may be desired.

By the simple expedient described, the blades of the rotor can be adjusted while the rotor is rotated thereby to vary the lift on the aircraft according to whatever is required under the circumstances.

Figure 11:
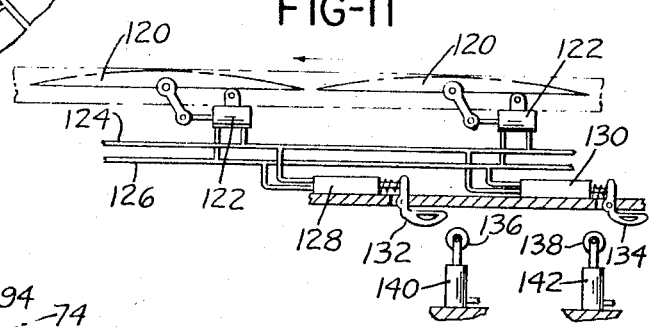
FIG. 11 is a view showing a modification of the rotor blade adjusting mechanism.

FIG. 11 shows a modification wherein each blade 120 of the rotor has its own adjusting motor 122. Each motor 122 is of the double acting type and respective conduits 124 and 126 are connected to respectively opposite sides of each motor. A reciprocating pump, substantially of the same type as previously mentioned is connected to each of conduits 124 and 126. These pumps are shown at 128 and 130 and each thereof, when actuated, will bring about a supply of fluid to the pertaining one of conduits 124, 126 while withdrawing fluid from thereof. By actuating one of pumps 128, the blades 120 are rotated in one direction, whereas, by actuating the other of the said pumps, the blades are caused to be adjusted in the opposite direction.

As before, each pump 128, 130 has a respective actuating lever 132, 134 and each group of the actuating levers has associated therewith a respective actuating element 136, 138 and each of the said actuating elements is selectively moveable into effective lever actuating position by a supply of fluid under pressure to a respective cylinder 140, 142. The levers 132, 134 and the actuating arrangements therefor are, of course, arranged in individual paths movement as illustrated in FIG. 10 so that the pumps are selectively actuatable. The actuating elements 136, 138 and their respective cylinders 140, 142 are, as before, stationarily mounted on the fuselage of the aircraft.

In the first described modification, the rotor was driven by an air turbine but FIG. 14 shows that a rotor 150 could be driven in rotation on the fuselage by a gear or friction disc 152 which is, in turn, driven by clutch 154 which derives motive power from one or the other of the jet engine installations either through a pneumatic or hydraulic or a mechanical medium.

FIG. 14, taken together with FIG. 15 also shows a modification of the rotor construction wherein the rotor has mounted in circumferentially spaced relation thereabout stationary segments 156 and disposed between each pair of adjacent segments 156 is a pair of blades 158 which are pivoted to the respective stationary segments 156 as by hinges 160.

As will be seen in FIG. 15, the adjacent edges of the blades 158 are interconnected by an arm 162 pivoted at 164 to the rotor frame and having a pin and slot connection at each end to the respective blade. An actuating lever 166 is connected with arm 162 and has an actuating motor 168 connected thereto. A reversible supply of fluid to motor 168 will cause movement of lever 166 and rotation of arm 162 and will thus bring about simultaneous adjustment of the blades connected thereto to vary the angle of attack thereof.

All of levers 166 could be interconnected by a ring, such as was described in connection with the first modification, or each of the said levers could have its own actuating motor, or each actuating motor could serve to actuate several levers at one time. Preferably, a single ring is provided for actuating all of the levers 166 at one time so that equal adjustment of all of the rotor blades is had in response to any adjusting impulse.

FIGS. 16 and 17 illustrate, somewhat schematically, a typical landing wheel arrangement. These figures show a landing gear wheel 170 carried on a column 172 which at its upper end is connected with a retracting and advancing motor 174. Each column 172 has pivoted thereto adjustable links 176 which serve to actuate the closure doors 178 for the wells in which the wheels are disposed when retracted.

The wheel illustrated in FIGS. 16 and 17 may also have a towing lug 180 on one side thereof and may, furthermore, have linkage 182 which can be employed in connection with the steering of the wheel.

It will be evident that a torque will be exerted on the fuselage as the bladed rotor is driven but this torque can be compensated by controlling the discharge from the respective jet engines so that the fuselage can always be oriented in the desired manner.

The aircraft according to the present invention is quite simple in operation.

In vertical take-off, the torque exerted on the rotor is counterbalanced by directing the engine discharge in a direction to develop an equal counter torque. The counter torque can be developed by adjustment of flaps 42 or by adjustment of vanes 56 in discharge outlets 50.

During lift-off cold-air exhaust is controlled with directional closure doors for side movement and side attitude with assistance from the hot-air directional fins 56 in the downward flow exhaust 50 or by rotating fuselage thereby directing exhaust nozzles 38.

For level flight, the rotor blades may be placed in autorotation for autogyro performance or locked in position at a zero collective pitch for fast Mach number speeds. The level flight is maintained by aerodynamic lift designed into fuselage and angle of attack of entire craft. The hot-air exhaust baffle 52 is placed in the level flight position which directs the engine exhaust thru the main nozzles 38 whose exhaust area is adjustable by opening and closing side baffles 42. Forward direction is controlled by the use of rudders 62 and by engine thrust utilized by changing engine speeds.

For climb and diving angles in the level flight position the downward exhaust 50 and horizontal main exhaust baffles 48 change the attitude.

For descent, the craft is brought to a slow speed and the cold-air ducts are opened. The direction may be controlled by rotating fuselage which may be changed thru 360° during flight. The craft may be landed with power off with the autorotation capabilities of the rotor which utilizes the stored energies.

Larger craft can utilize in flight engine repair or even engine rooms. Reverse thrust engines can also be used for counter torque and fuselage rotation.

It will be understood that this invention is susceptible to modification in order to adapt it to different usages and conditions and, accordingly, it is desired to comprehend such modifications within this invention as may appear to those skilled in the art.

What is claimed is:

1. An aircraft having a disc-like fuselage, a rotor concentrically surrounding said fuselage and rotatably supported thereon, blades on said rotor tiltable thereon about axes radial to the rotor, jet engine means in the fuselage, compressor means driven by said jet engine means, an air turbine fixed to said rotor and including exhaust air discharge means on the bottom of the fuselage to discharge the exhaust air in the downward direction, control flap means on said discharge means adjustable to impart a lateral component of velocity to the discharged air, and power transmitting means operatively connecting the engine means with the rotor for driving the rotor in rotation on the fuselage, said power transmitting means comprising duct means receiving air under pressure from said compressor means and discharging air to said turbine in driving relation thereto.

2. An aircraft according to claim 1, in which said duct means includes vane means adjustable alternately to increase and decrease lateral thrust therein at the end adjacent said turbine.

3. An aircraft according to claim 1, in which the jet engine means comprises a jet engine on each side of the longitudinal axis of the aircraft, said compressor means comprising a compressor driven by each engine, said duct means comprising a duct leading from each compressor to a respective region of the turbine on a respective lateral side of the aircraft, said discharge means comprising a discharge duct in each said region of the turbine and each discharge duct having a respective control flap.

4. An aircraft according to claim 1 in which the fuselage includes a passenger compartment located in the center of the upper portion thereof.

5. An aircraft having a disc-like fuselage, a rotor concentrically surrounding said fuselage and rotatably supported thereon, blades on said rotor tiltable thereon about axes radial to the rotor, engine means in the fuselage and comprising a jet engine on each side of the longitudinal axis of the aircraft having a discharge nozzle means at the rear of the fuselage, flap means pertaining to said nozzle means and adjustable to vary the width and direction of the discharge therefrom, power transmitting means operatively connecting the engine means with the rotor for driving the rotor in rotation on the fuselage, a discharge duct connected to each engine upstream from the discharge nozzle thereof and directed generally downwardly, and a control vane at the inlet end of each discharge duct movable from position to close the said inlet end into position to divert at least a portion of the engine discharge into the discharge duct.

6. An aircraft according to claim 5, which includes tiltable vanes in each discharge duct near the exit end thereof and selectively tiltable to control the amount of the lateral component of velocity in the discharge from the respective discharge duct.

References Cited

UNITED STATES PATENTS

| | | | |
|---|---|---|---|
| 2,863,621 | 12/1958 | Davis | 244—23 |
| 2,935,275 | 5/1960 | Grayson | 244—23 |
| 2,947,496 | 8/1960 | Leggett | 244—12 |
| 3,045,951 | 7/1962 | Freeland | 244—23 |
| 3,372,892 | 3/1968 | May et al. | 244—102 |

FOREIGN PATENTS 678,700  1/1964  Canada.

MILTON BUCHLER, Primary Examiner

J. E. PITTENGER, Assistant Examiner

U.S. Cl. X.R.

244—23